(12) United States Patent
Lee et al.

(10) Patent No.: US 7,127,163 B2
(45) Date of Patent: Oct. 24, 2006

(54) RING LIGHT GUIDE

(75) Inventors: Junwon Lee, Webster, NY (US);
Steven J. Hansen, Pudong (CN);
Rongguang Liang, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 173 days.

(21) Appl. No.: 10/922,312

(22) Filed: Aug. 19, 2004

(65) Prior Publication Data

US 2006/0039692 A1    Feb. 23, 2006

(51) Int. Cl.
*G03B 15/03* (2006.01)
*G02B 6/10* (2006.01)

(52) U.S. Cl. ............... 396/198; 396/199; 396/267; 362/7; 362/16; 358/146

(58) Field of Classification Search ............ 396/16, 396/155, 198, 199, 267; 362/3, 7, 16; 385/146, 385/147

See application file for complete search history.

(56) References Cited

U.S. PATENT DOCUMENTS

| 3,474,242 A | 10/1969 | Forrant ............ 362/7 |
| 4,085,436 A | 4/1978 | Weiss ............ 362/16 |
| 4,921,344 A | 5/1990 | Duplantis ............ 396/16 |
| 6,430,371 B1 | 8/2002 | Cho ............ 396/176 |
| 2001/0010760 A1 | 8/2001 | Saito ............ 396/16 |

*Primary Examiner*—W. B. Perkey
(74) *Attorney, Agent, or Firm*—Nelson Adrian Blish

(57) ABSTRACT

A ring illuminator (20) has a light channeling section (22) with an input face (24) optically coupling the light channeling section (22) to a flash unit (16) of a camera (12) for obtaining flash illumination therefrom. A ring section (26) is optically coupled to the light channeling section and extends around an aperture for fitting the ring illuminator around a lens (14). The ring section has a rear surface (30) for positioning toward the body of the camera. The rear surface has a plurality of light redirecting features (28) for redirecting at least a portion of the flash illumination from within the ring section outward from the camera, around the lens of the camera.

18 Claims, 17 Drawing Sheets

RING LIGHT GUIDE

FIELD OF THE INVENTION

The present invention relates to an illumination apparatus for flash photography and more particularly to a ring light attachable to a camera for redistributing illumination from the camera flash unit.

BACKGROUND OF THE INVENTION

In conventional camera design, the flash illumination source of the camera is off-axis with respect to the objective lens of the camera and illuminates from one angular orientation only. While this may be acceptable for the bulk of imaging applications, this arrangement is particularly troublesome for close-up imaging, such as in dental imaging and imaging of small objects in near distance. In close-up camera work, the conventional flash illumination arrangement often results in undesirable shadow and overexposure effects.

In response to the need for improved light distribution for minimizing shadows and other effects in close-up imaging, ring illumination has been developed. In ring illumination, a ring of light, ideally centered about the objective lens optical axis, is projected outward toward the imaging object. There have been a number of ring illumination solutions, including active ring light solutions that provide an alternate light source from the flash unit of the camera itself. Exemplary active ring light solutions include commercial products such as the Digi-Slave L-Ring Ultra LED Ring Light, from Digi-Slave, from SR Inc., Irving, Tex. This device threads onto the camera lens assembly and provides flash illumination from a circular array of bright LEDs. Another commercial solution is the Samigon Halo-Light FRL-1 Fluorescent Ring Light from Argraph Corp., Carlstadt, N.J. This device provides a continuous, bright ring of light when installed onto the camera lens. Other active ring light solutions are disclosed in U.S. Pat. No. 4,921,344 (Duplantis) and U.S. Patent Application Publication 2001/0010760 (Saito).

While such active ring light devices provide improved illumination for many types of close-up photography applications, there are some drawbacks. For example, many conventional ring lights require a separate source of electrical power, cabling for flash synchronization, and light sources of some type. Because of this, a conventional ring light system can be complex and costly. Another key disadvantage of such active ring light solutions relates to the suitability of the illumination provided to any particular camera. In most types of cameras, particularly cameras using a built-in flash mechanism, the spectral and intensity characteristics of the flash illumination are at least somewhat matched to the camera itself. Devices that substitute other types of light sources for flash illumination may indeed minimize shadows and other effects but, at the same time, may compromise image quality, particularly with respect to color balance. Other drawbacks with many conventional devices include excessive size and weight.

Using an alternative approach to the active ring light, various ring light solutions have been proposed for redirecting light from a conventional flash illumination mechanism into a ring light arrangement. For example:

U.S. Pat. No. 6,430,371 (Cho) discloses a ring light that uses a cluster of optical fibers to re-route light from the camera flash unit to an output ring.

U.S. Pat. No. 4,085,436 (Weiss) discloses an attachment with a translucent ring, having silvered reflective surfaces for distributing light around the ring. A plate member of this ring is clamped onto a separate electronic flash unit for redistributing light as ring illumination. The assembled and clamped ring light is then installed onto the camera lens.

U.S. Pat. No. 3,474,242 (Forrant) discloses a photographic ring light accessory that can be fitted around the camera lens, consisting of a somewhat horseshoe-shaped translucent light guide encased within a housing structure, the light guide ring having a gap at the base for accommodating its own flash source.

While these solutions may provide light with spectral characteristics that are better suited to the individual camera type, drawbacks of complexity, cost, size, and usability remain. Ideally, for example, a ring light should be easy for a relatively unskilled photographer to carry, install, and use. Thus, it can be seen that there is a need for a ring light that is compact and inexpensive, fits readily onto a camera, allows straightforward use by an amateur photographer, and provides effective redistribution of light from the camera flash unit itself, without the complexity of a separate power source, light source, electrical connection, or synchronization components.

SUMMARY OF THE INVENTION

The present invention provides a compact ring light suitable for many types of close-up photography. To do this, the present invention provides a ring illuminator comprising:

a) a light channeling section comprising an input face for optically coupling the light channeling section to a flash unit of a camera for obtaining flash illumination therefrom;

b) a ring section optically coupled to the light channeling section and extending around an aperture for fitting the ring illuminator around a lens of the camera;

the ring section comprising a rear surface for positioning toward the body of the camera; and the rear surface comprising a plurality of light redirecting features for redirecting at least a portion of the flash illumination from within the ring section outward from the camera, around the lens of the camera.

The ring illuminator of the present invention thus creates uniform illumination in angular and spatial domains by reconfiguring light from a camera flash unit and redirecting the light to a light ring surrounding a camera lens. The ring light of the present invention is advantaged in that its geometry can be fairly complex to minimize light leakage and to allow a high degree of optical efficiency and uniform illumination, yet the unit cost of the ring light can be relatively low.

The ring illuminator of the present invention is advantaged over conventional ring light solutions by its relative simplicity, allowing ease of use, low-cost fabrication, and disposability for applications such as with single-use cameras. The ring illuminator according to the present invention can be a single piece unit, without any supporting casing, housing, or surface coatings, without any electrical connections, and without fasteners or parts needing replacement.

It is another advantage of the present invention that it allows the design of a ring illuminator that utilizes the built-in light output and light sensing components of a camera, minimizing or eliminating the need to make manual adjustments to camera operation to compensate for ring lighting use.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description will be directed in particular to elements forming part of, or in cooperation more directly with the apparatus in accordance with the present invention. It is to be understood that elements not specifically shown or described may take various forms well known to those skilled in the art.

Figure 1:
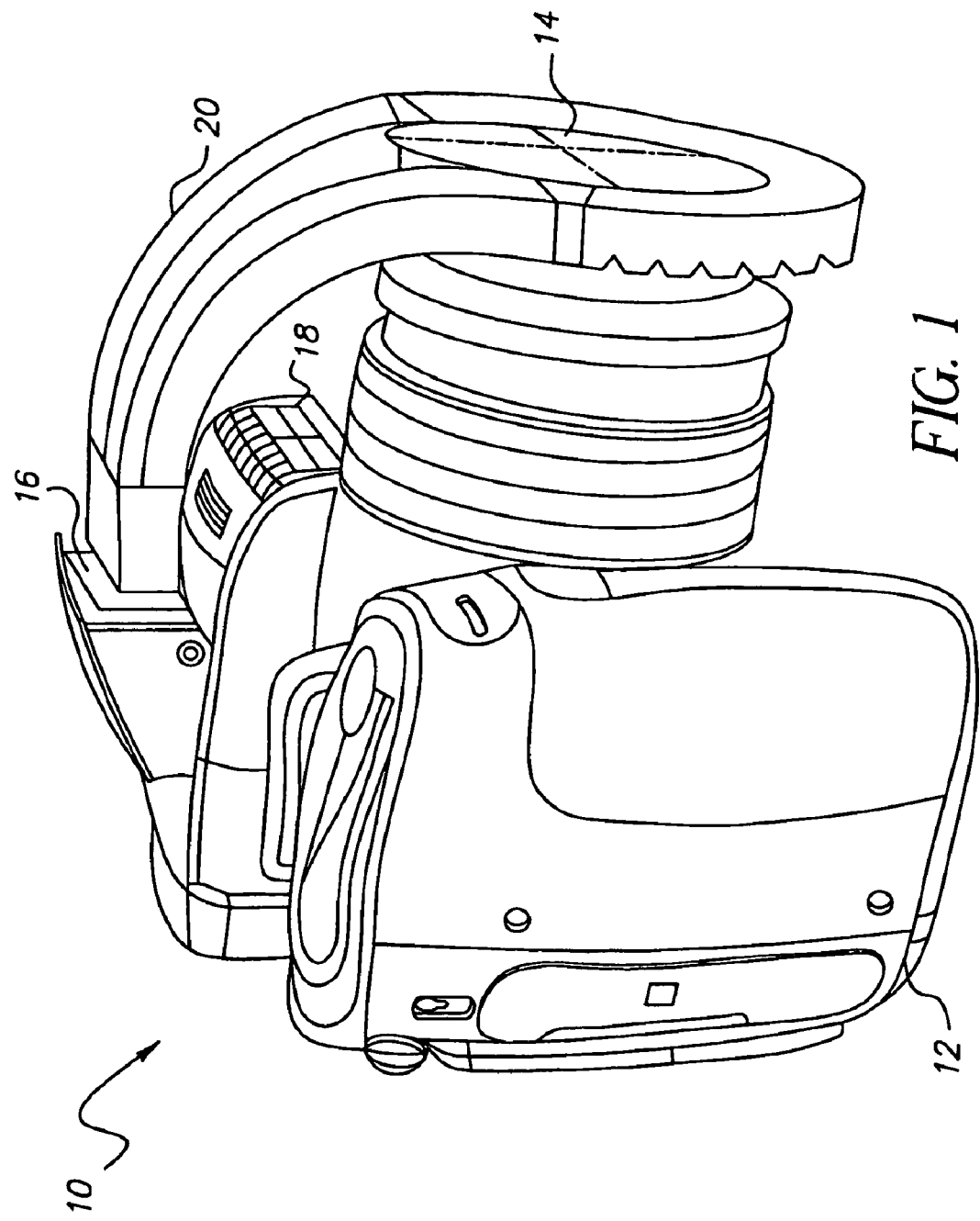
FIG. 1 is a perspective view of a system for close-up imaging according to the present invention.
Figure 2:
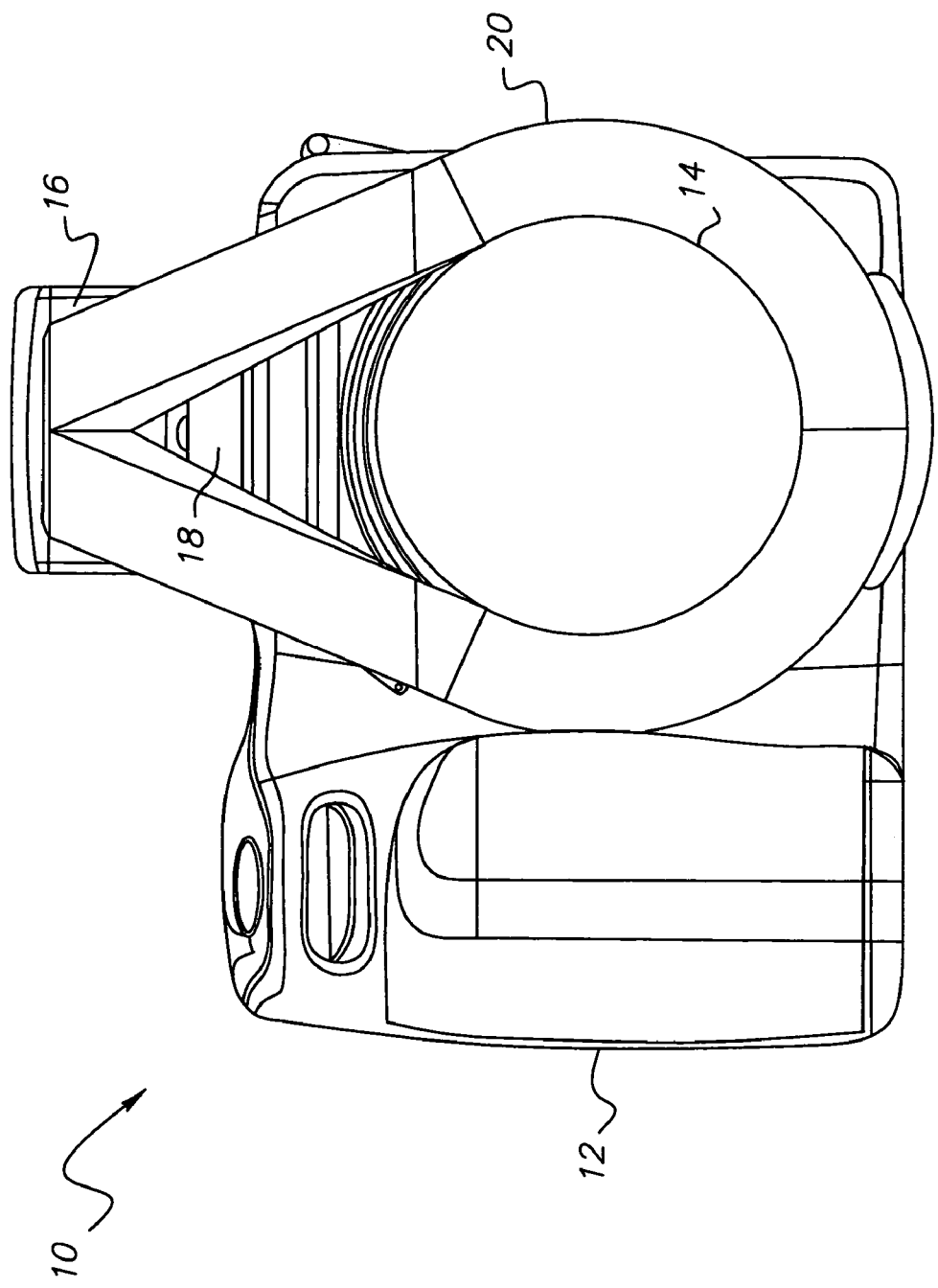
FIG. 2 is a front view of a system for close-up imaging according to the present invention.
Figure 3:
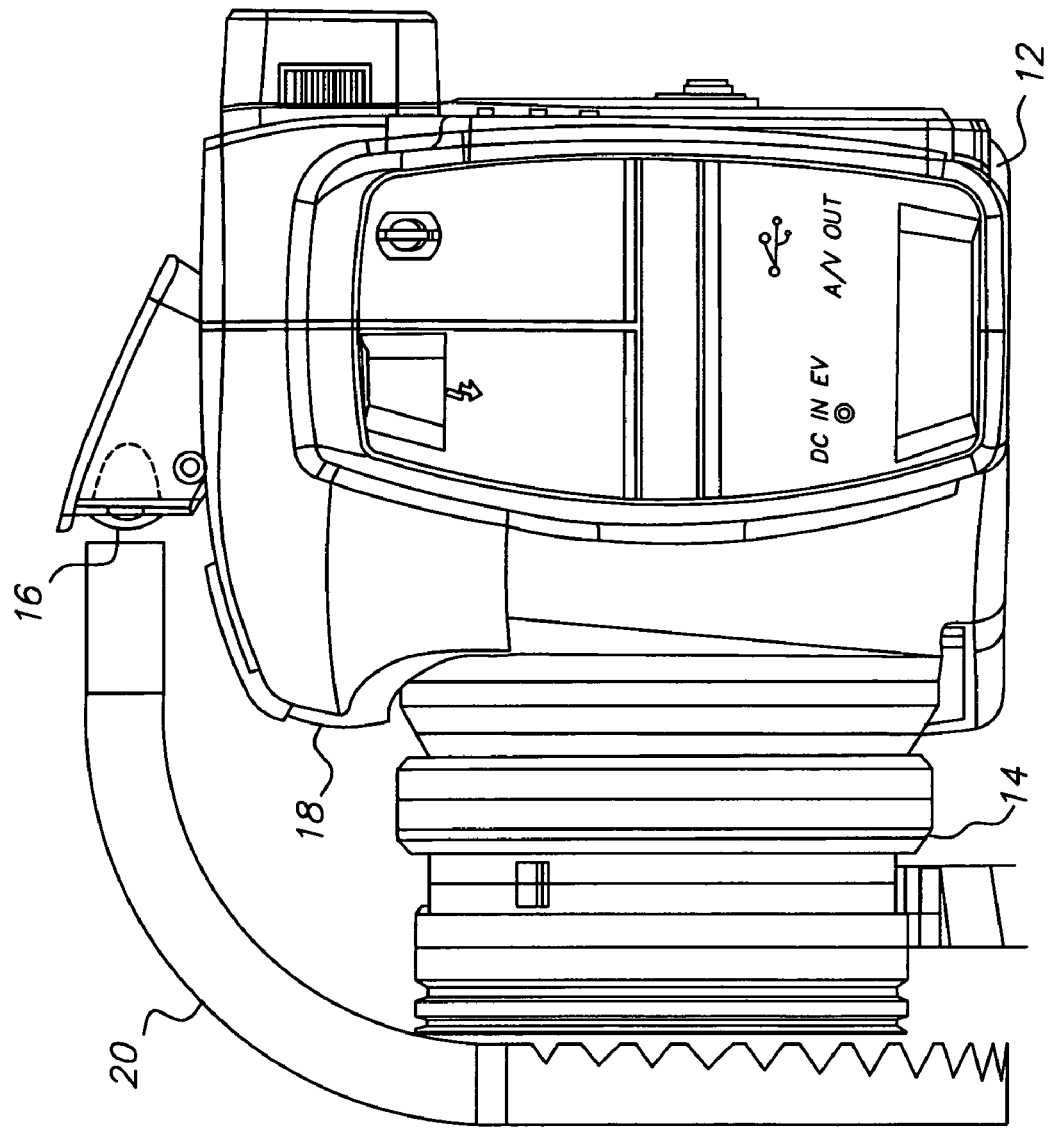
FIG. 3 is a side view of a system for close-up imaging according to the present invention.

Referring now to FIG. 1 an image capture system for close up imaging is referred to in general by numeral 10. Image capture system 10 comprises a camera 12 having an attached ring light guide 20. Camera 12 has a close-up lens 14 that may be integral to camera 12 or may be a separable accessory. A flash unit 16 is preferably integral to camera 12 and may be built into the main body of camera 12 as a fixed-position device or may be a pop-up flash unit or other type of protruding flash unit. Alternately, flash unit 16 may be an accessory unit attached to camera 12 when needed. A light sensor 18 provides feedback on scene illumination and can be used to control flash duration and various settings within camera 12, as is well known in the photographic imaging arts. In the preferred embodiment, camera 12 is a digital camera; however, ring light guide 20 could be similarly used with a conventional film-based camera. FIGS. 2 and 3 show front and side views, respectively, of image capture system 10.

In order to provide a simple and inexpensive solution for ring lighting, ring light guide 20 redirects light from flash unit 16 around lens 14 and outward from camera 12, toward the subject. Ring light guide 20 advantageously requires no moving parts or separate light sources, power supplies, synchronization signals or components, or complex fasteners. Instead, ring light guide 20 can be fabricated from low-cost materials, preferably as a single-piece unit, designed to snap into place to fit snugly around close-up lens 14, as shown in FIGS. 1, 2, and 3. In one embodiment, for example, ring light guide 20 is a molded acrylic device.

Figure 5:
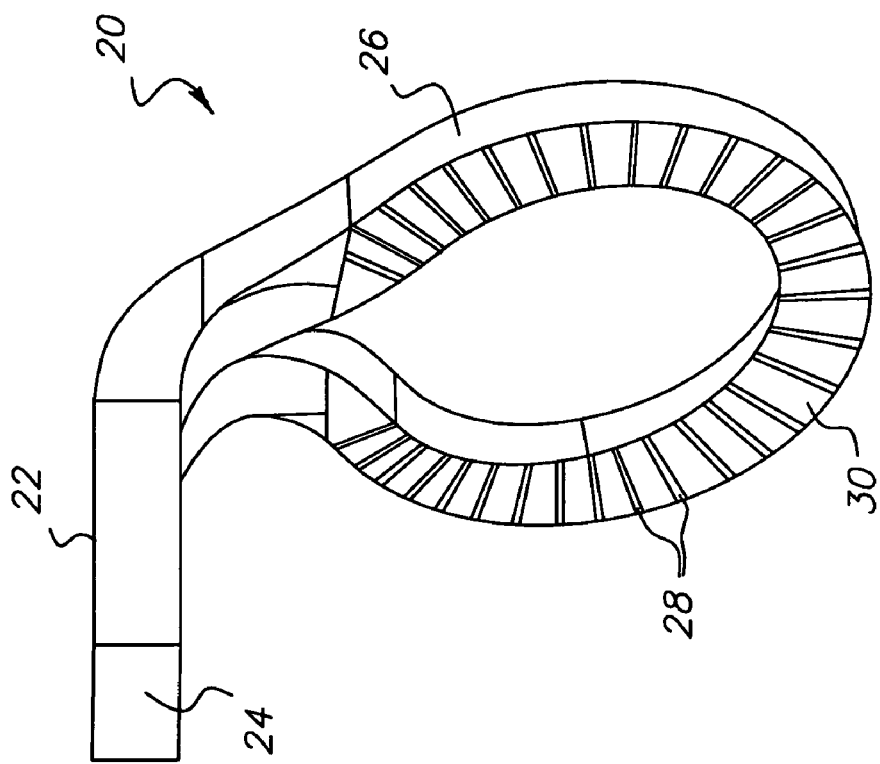
FIG. 5 is a rear perspective view of the ring light guide according to one embodiment.
Figure 4:
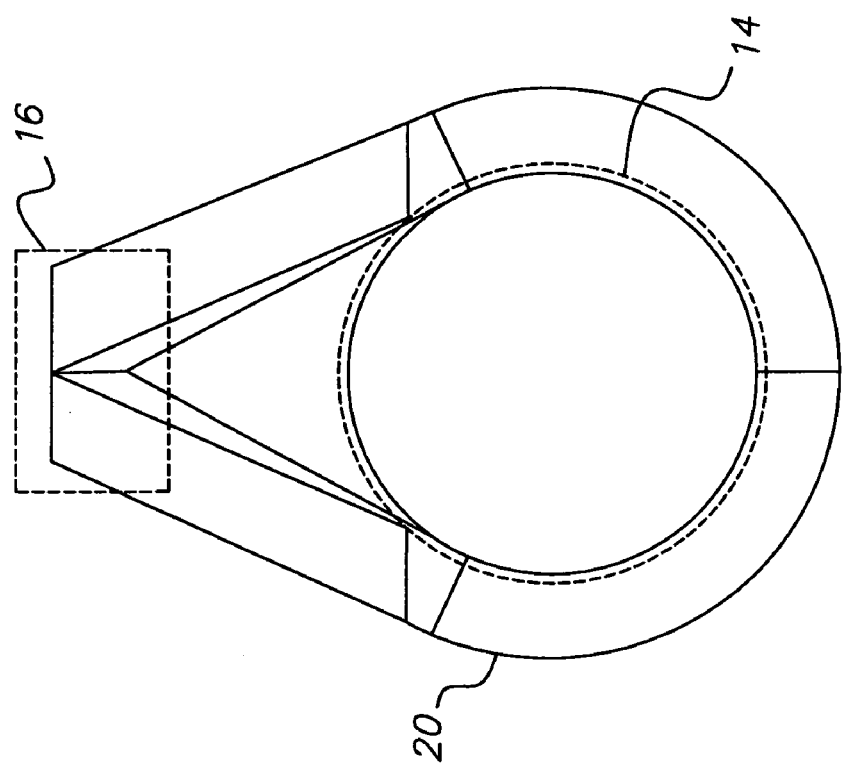
FIG. 4 is a plan view showing a ring light guide in one embodiment.
Figure 6A:
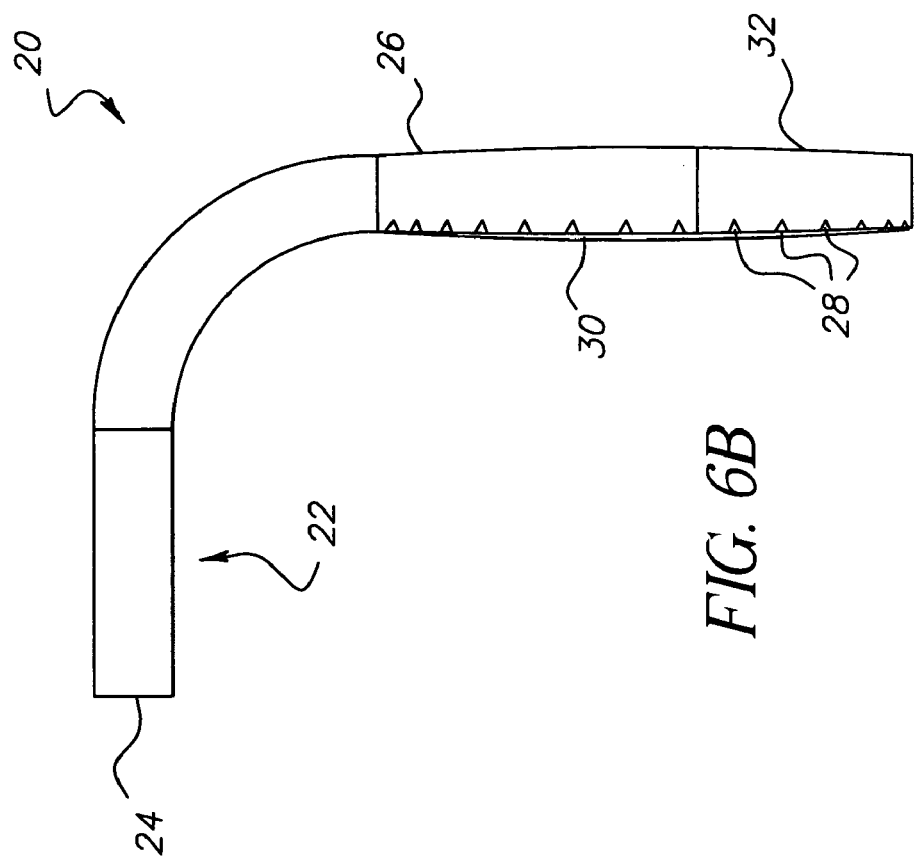
FIGS. 6A and 6B are side views of a ring light guide in slightly different embodiments.
Figure 6B:
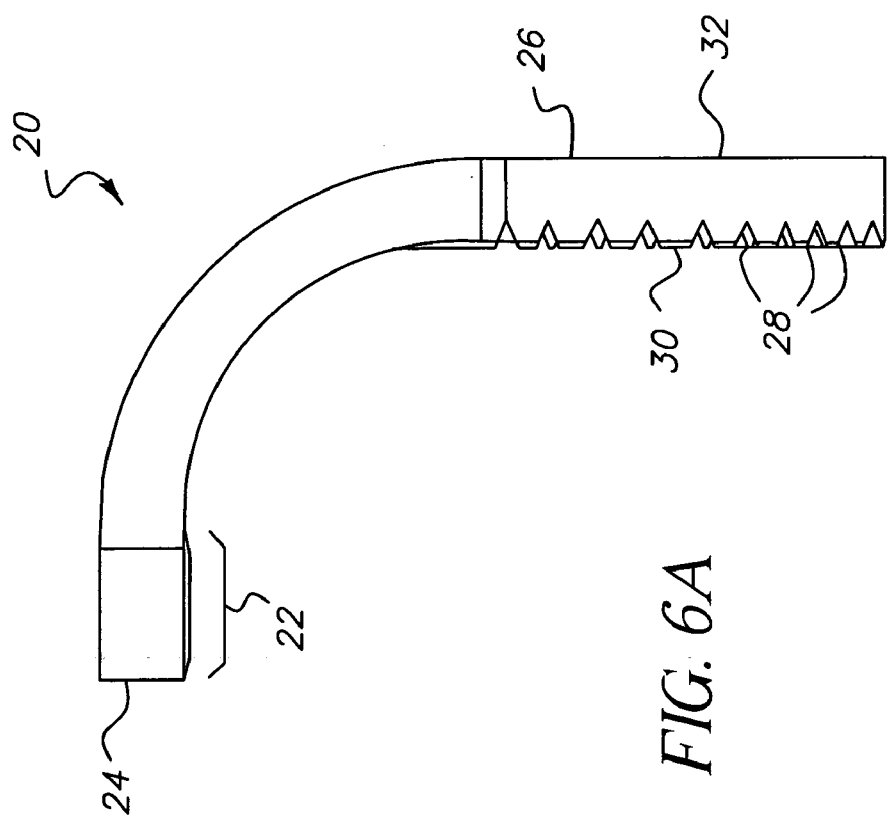

As shown in FIGS. 1, 2 and 3, and called out more particularly in FIG. 4, ring light guide 20 has one portion that is placed proximate to or directly against flash unit 16 and a curved portion that fits around close-up lens 14. As is best shown in FIG. 2, the structure of ring light guide 20 leaves at least some portion of sensor 18 unobstructed, allowing the built-in light-sensing circuitry of camera 12 to operate normally when right light guide 20 is installed. Referring to FIGS. 5, 6A, and 6B, there are shown rear perspective and alternate side views respectively that more clearly show the structure of ring light guide 20. Ring light guide 20 has two primary functional sections: a light channeling section 22 for obtaining light from flash unit 16 at an input face 24 and a curved ring section 26 for redistributing the light. A rear surface 30 of ring section 26 has an arrangement of discrete features 28 for redirecting light that has been routed through ring section 26 outward through a front surface 32, toward the subject being imaged.

Unlike prior art solutions that use reflective coatings applied to the light ring surface for light redistribution, ring light guide 20 of the present invention redirects light from flash unit 16 using total internal reflection (TIR). This redirected light is then redistributed around ring section 26 and then, by frustrating TIR at rear surface 30, is directed outward toward the subject being imaged by camera 12. The mechanism of TIR, a key principle used for light transmission in optical fibers, is widely known in the illumination art for implementing other types of light pipes as well. Briefly, for TIR, inherent behavior of a light pipe structure made of translucent material such as glass or plastic is used. Light is reflected at the interface of the light pipe structure with a surrounding material that has a lower refractive index, such as air, provided that certain conditions of incident angle and refractive index are met. Stated mathematically, TIR occurs when the following relationships are satisfied:

$$\theta_i \geq \sin^{-1}(n_2/n_1) \text{ and } n_2 \leq n_1$$

where $\theta_i$ is an incident angle of a light ray within the translucent light pipe structure on the interface, $n_1$ a refractive index of the structure, and $n_2$ a refractive index of the surrounding material at the interface. (Typically the surrounding material is air, whose refractive index $n_2$ is 1.)

It is instructive to note that the entire structure of ring light guide 20 operates as a type of light pipe, channeling light throughout its length using TIR. The specific portion of ring light guide 20 identified as light channeling section 22 in FIGS. 5, 6A, 6B, and elsewhere has this primary function, providing a channel for light obtained from flash unit 16 using TIR. The curved portion of ring light guide 20, identified as ring section 26 is more complex. Here, light is directed around a curve using TIR. Features 28 on rear surface 30 then frustrate TIR at that surface to cause the redirection of light in a ring.

Figure 12:
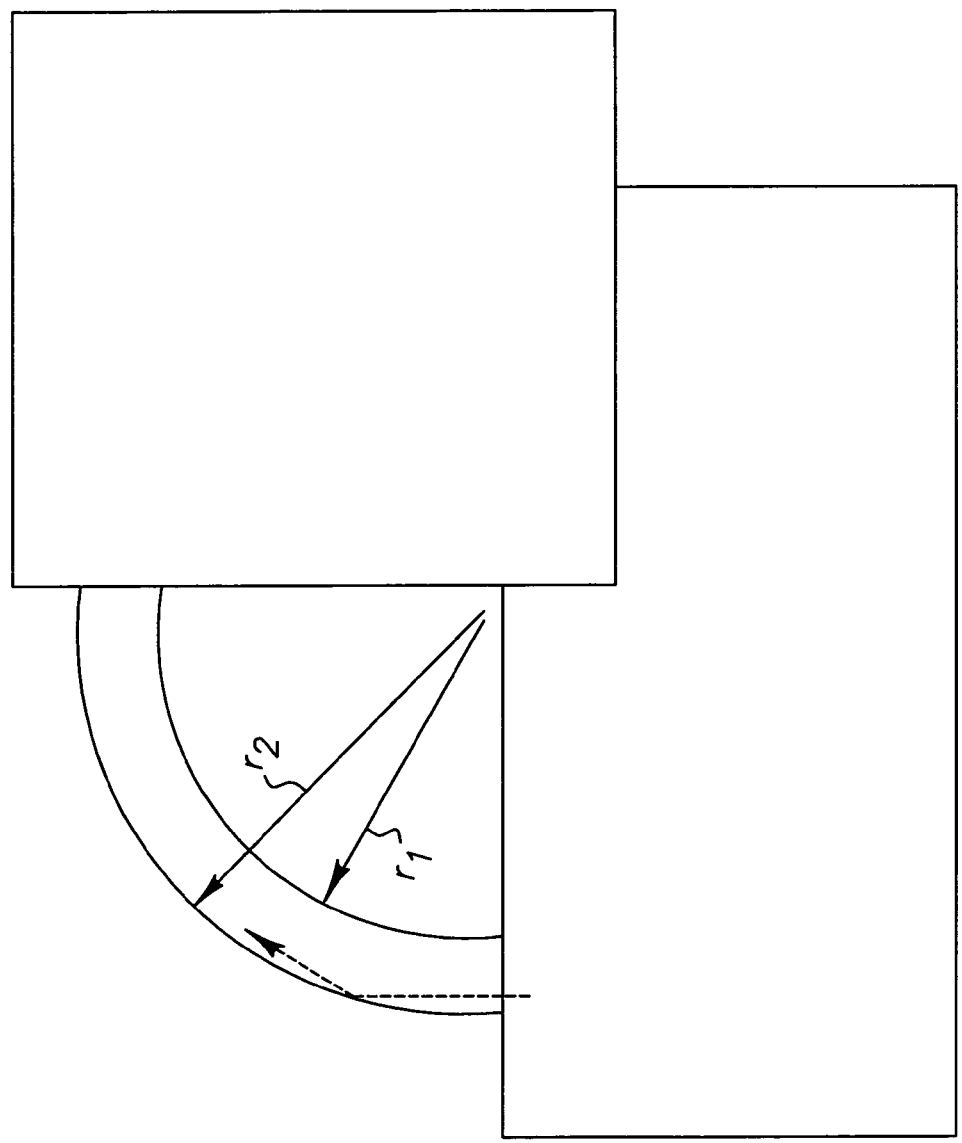
FIG. 12 is a diagram showing key dimensional relationships for maintaining total internal reflection within a curved structure.

TIR can be maintained over a relatively straight section of translucent material as well as around a curve, provided that the overall curvature is suitably constrained. Referring to FIG. 12, there are shown key geometrical parameters influencing TIR behavior over a curved section. Here, a portion of ring section 26 has an inner radius $r_1$ and outer radius $r_2$. In order to maintain TIR for any light directed about this curve, the following relationship must hold:

$$r_2/r_i \leq n$$

where n is the index of refraction of the translucent material used to form ring section 26.

It is important to emphasize that the design of ring light guide 20 uses TIR, but that the efficiency of this component may vary. For many types of close-up imaging applications, only a percentage of the light from flash unit 16 would be needed. Thus, strict adherence to the relationship of radii $r_1$ and $r_2$ given above would not be necessary for redistribution of sufficient light for ring illumination. For similar reasons, input face 24 need not fully cover the surface of flash unit 16; input face 24 need only direct sufficient light from this source for distribution around ring section 26.

Design Options

Given the basic overall design of ring light guide 20 as shown in FIGS. 1 through 6B, a number of variations in shape, thickness, light distribution, and in mechanisms for TIR frustration by different types of features 28 are possible. FIGS. 7, 8, 9, 10, and 11A–11D show some of these variations from different views.

Figure 13A:
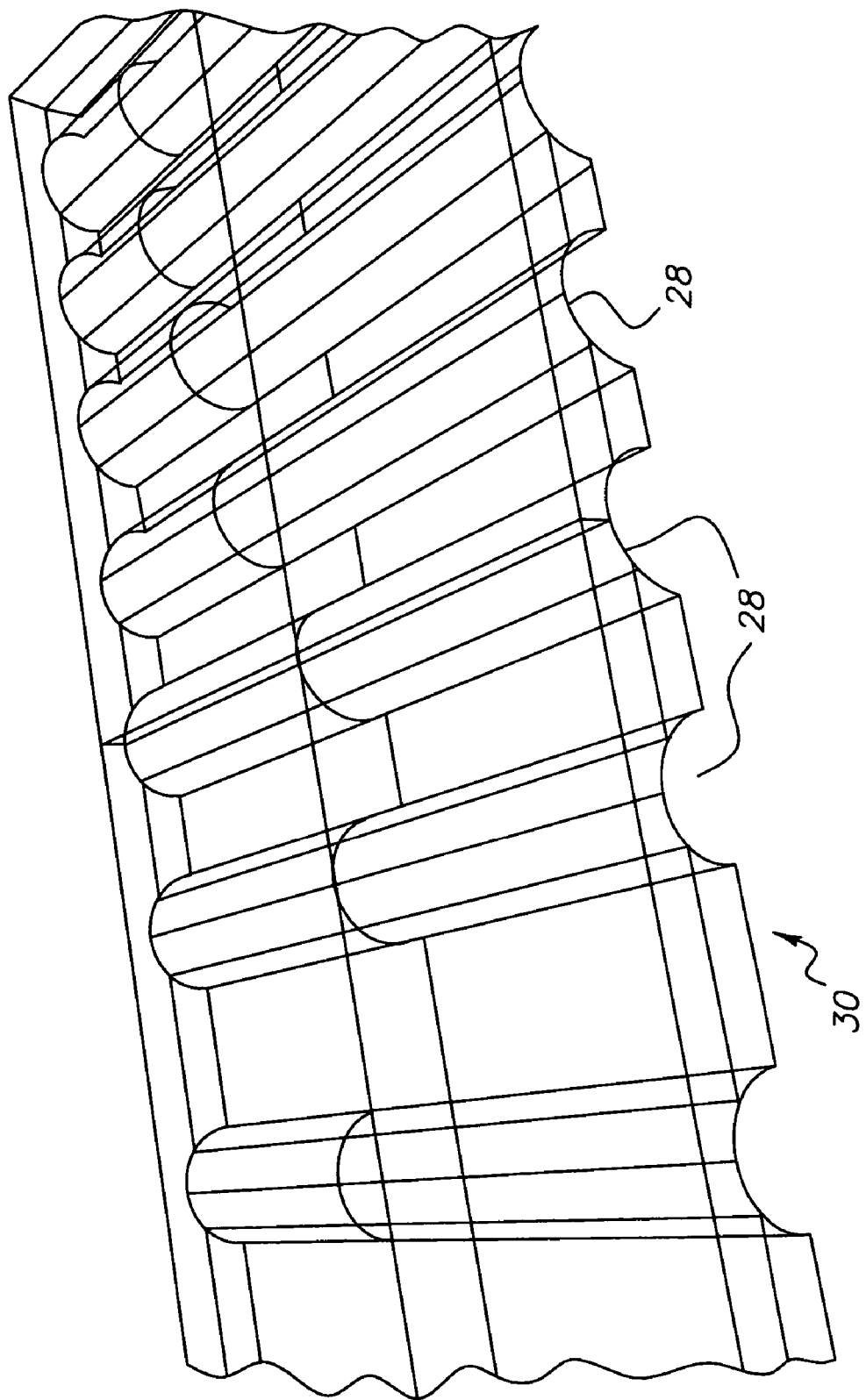
FIGS. 13A, 13B, 13C, and 13D show alternative features for light redirection from the rear surface of the right light guide of the present invention.
Figure 13B:
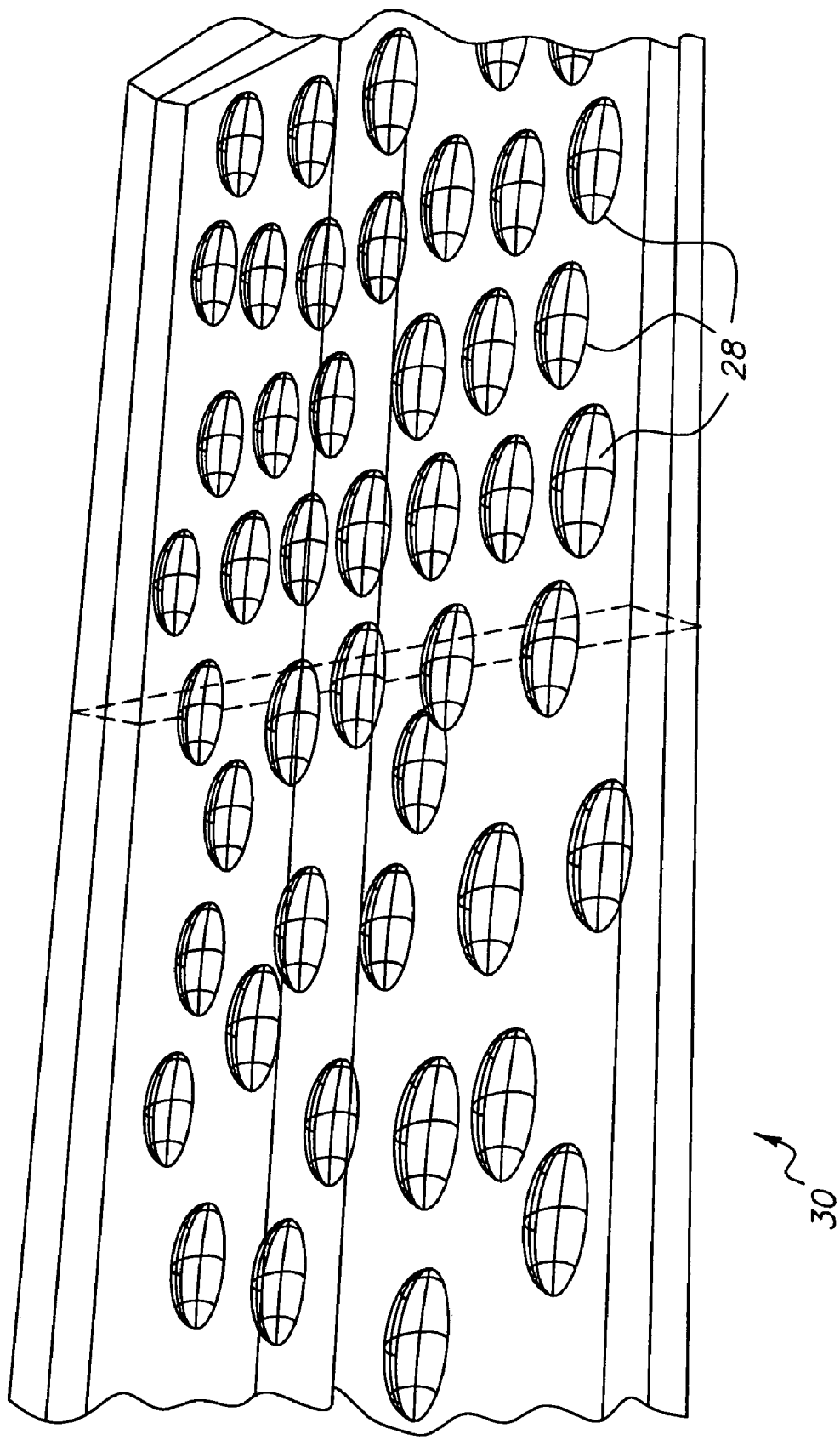
Figure 13C:
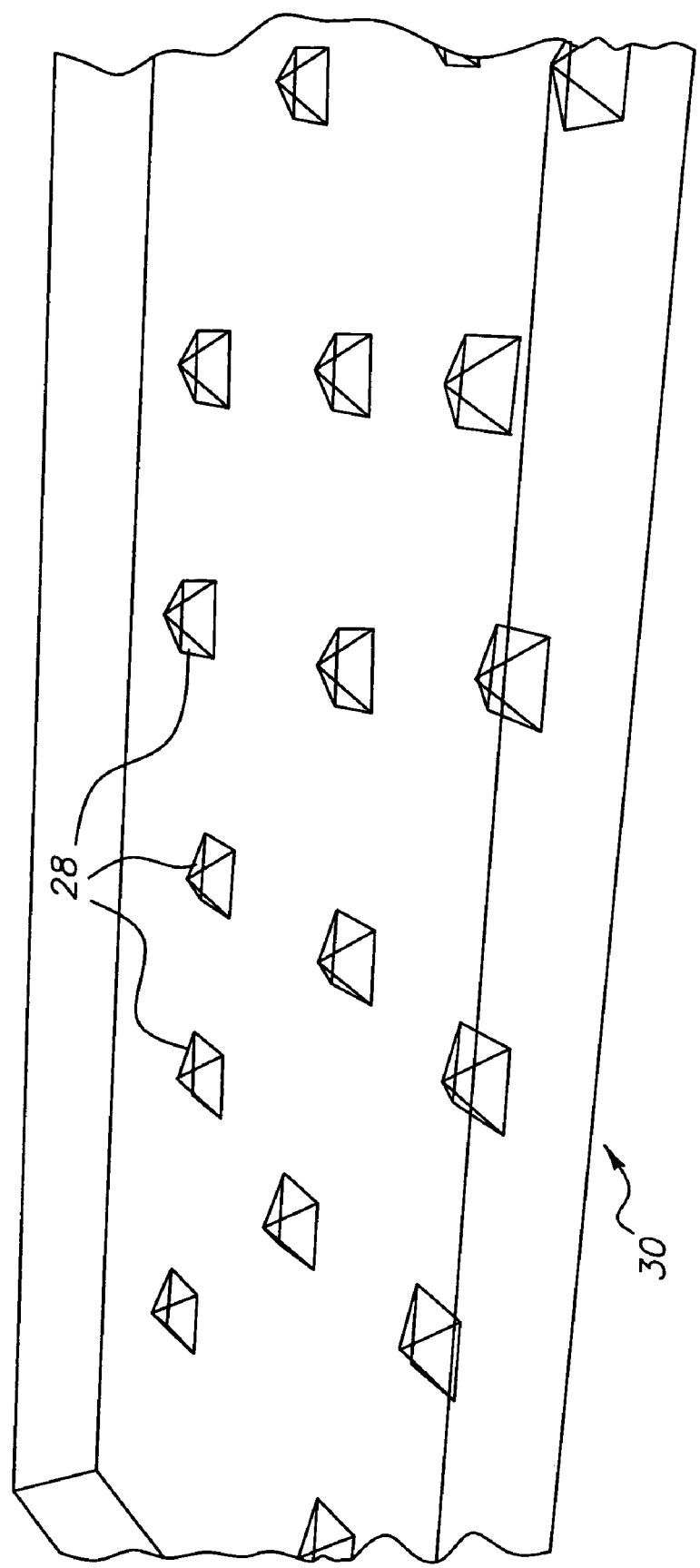
Figure 13D:
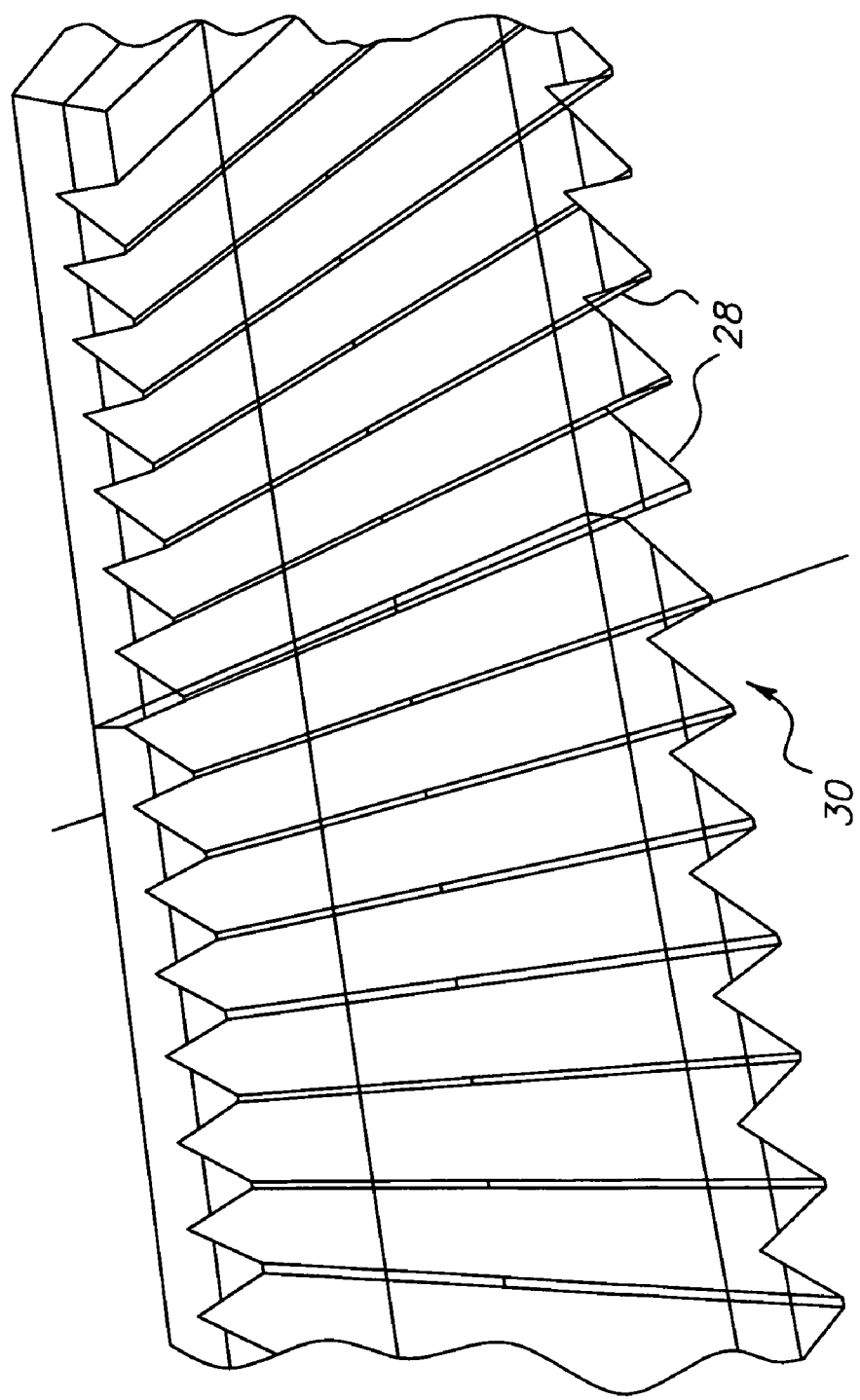

Various types of features 28 can be formed on rear surface 30 for frustration of TIR. Features 28 are non-continuous and non-planar, that is, are not flat, smooth reflective surfaces or coatings. Instead, features 28 are discrete elements such as indentations, printed or otherwise applied patterns, or protrusions that provide some type of light-scattering surface discontinuities for frustrating TIR at rear surface 30. In one embodiment, features 28 can be a plurality of indented grooves or a sawtooth arrangement that effectively provides prisms for light redirection. FIGS. 7, 8, 9, and 10 show an alternate embodiment in which features 28 present a generally sawtooth profile, as shown in the perspective view of FIG. 13D. Alternately, features 28 could have the shape of circularly cylindrical grooves as shown in FIG. 13A, as well as using some other type of groove shape. Yet another configuration uses an array of discrete indentations or protrusions. FIG. 13B, for example, shows features 28 as an array of ellipsoidal indentations formed into rear surface 30. FIG. 13C shows yet another alternative embodiment in which features 28 are pyramidal indentations into rear surface 30. As FIGS. 13B and 13C particularly show, a regular distribution of features 28 having equal pitch is not a requirement; there may be optimal arrangements of features 28 using irregular feature-to-feature spacing for more uniform distribution of illumination, for example. Also, combinations using different types of features 28 could also be employed. Certainly, some portion or all of features 28 could be coated or provided with a backing material that provides reflectivity to supplement light redirection; however, the primary redirection mechanism disrupts TIR on rear surface 30. Scattering dots, printed or applied in some other manner, could also be used as features 28 or to supplement grooves or other structures that act as features 28. While scattering dots could be used, however, they are not highly directional and can tend to diffuse light.

Figure 8:
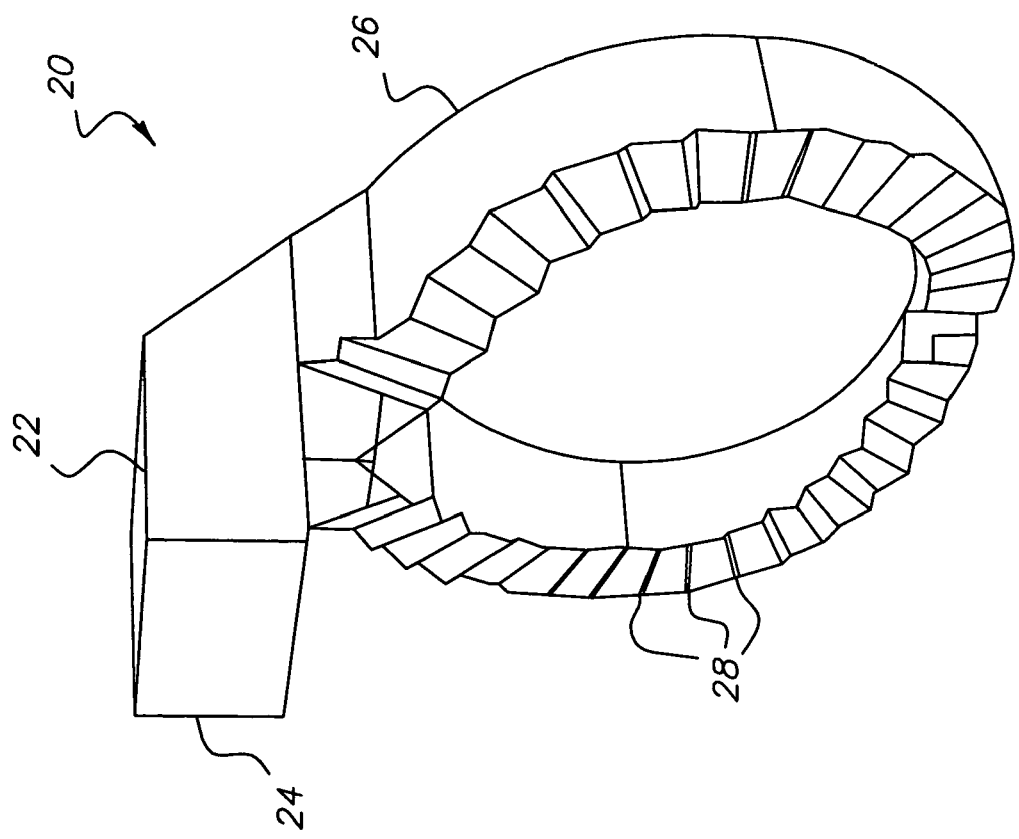
FIG. 8 is a rear perspective view of the tapered ring light guide of FIG. 7.
Figure 7:
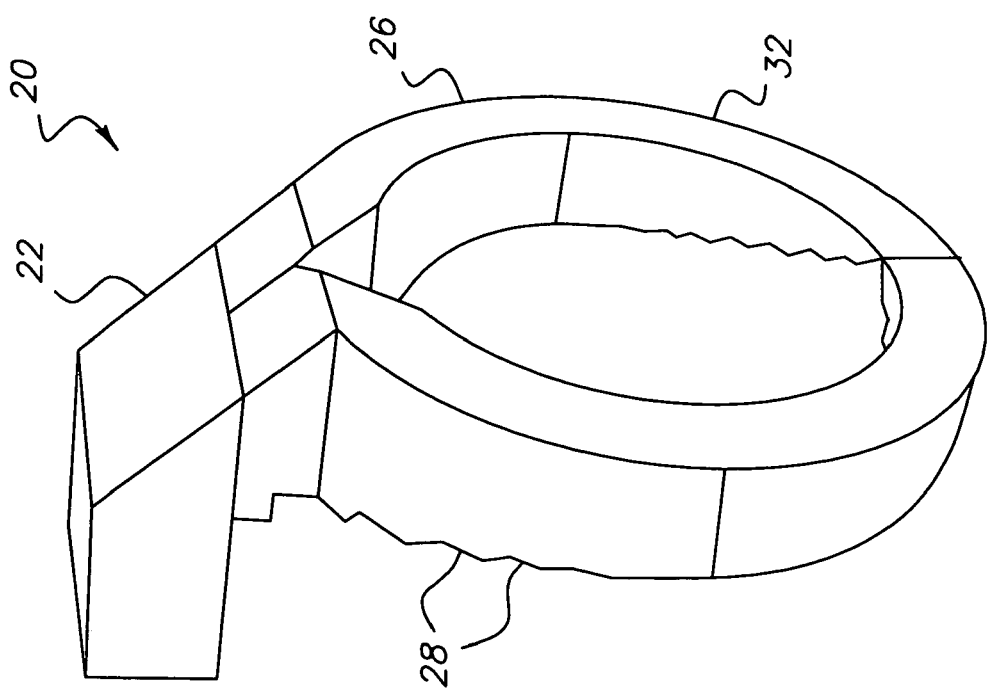
FIG. 7 is a front perspective view of a ring light guide in a tapered embodiment.
Figure 9:
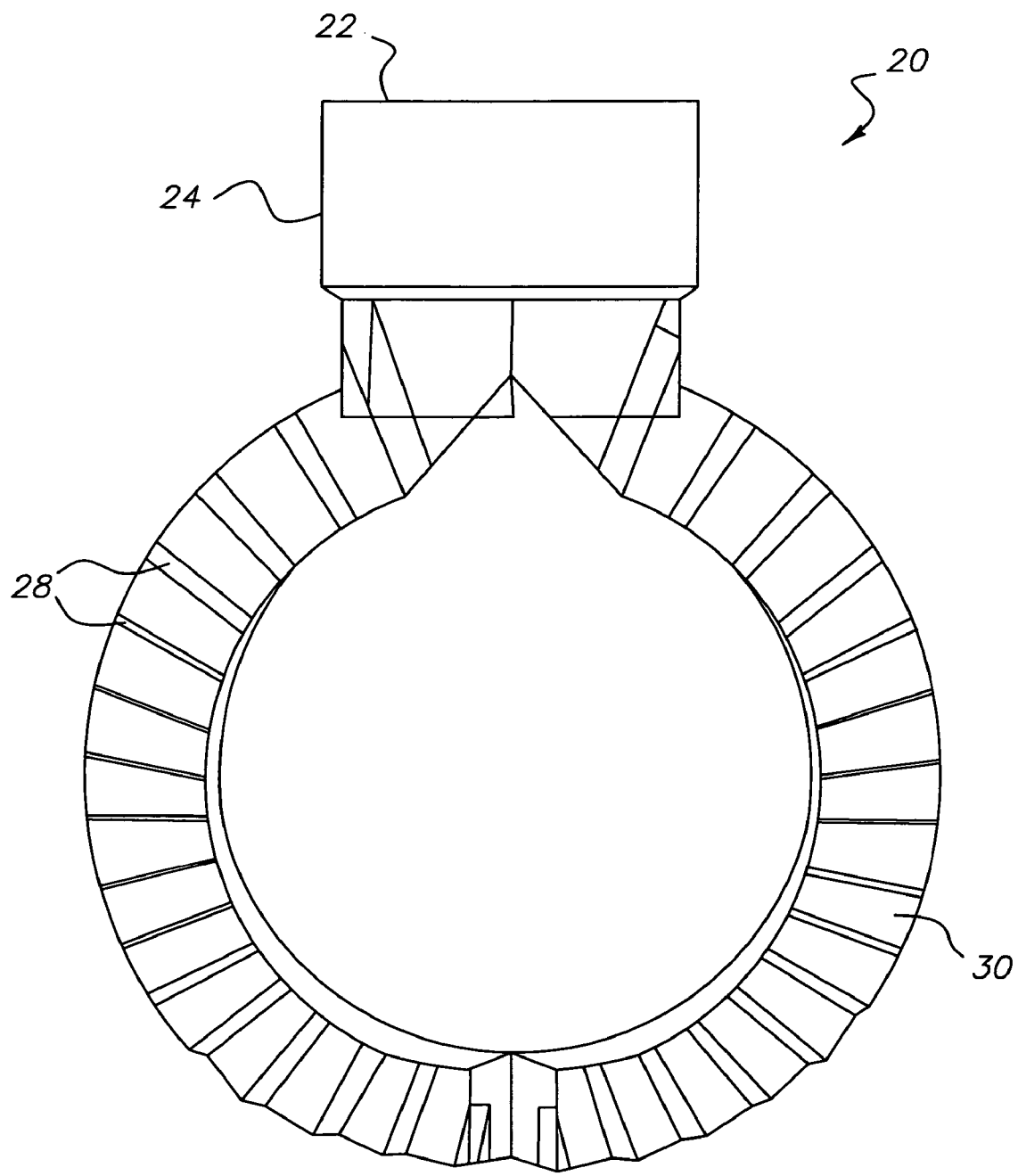
FIG. 9 is a rear view of the tapered ring light guide of FIG. 7.
Figure 10:
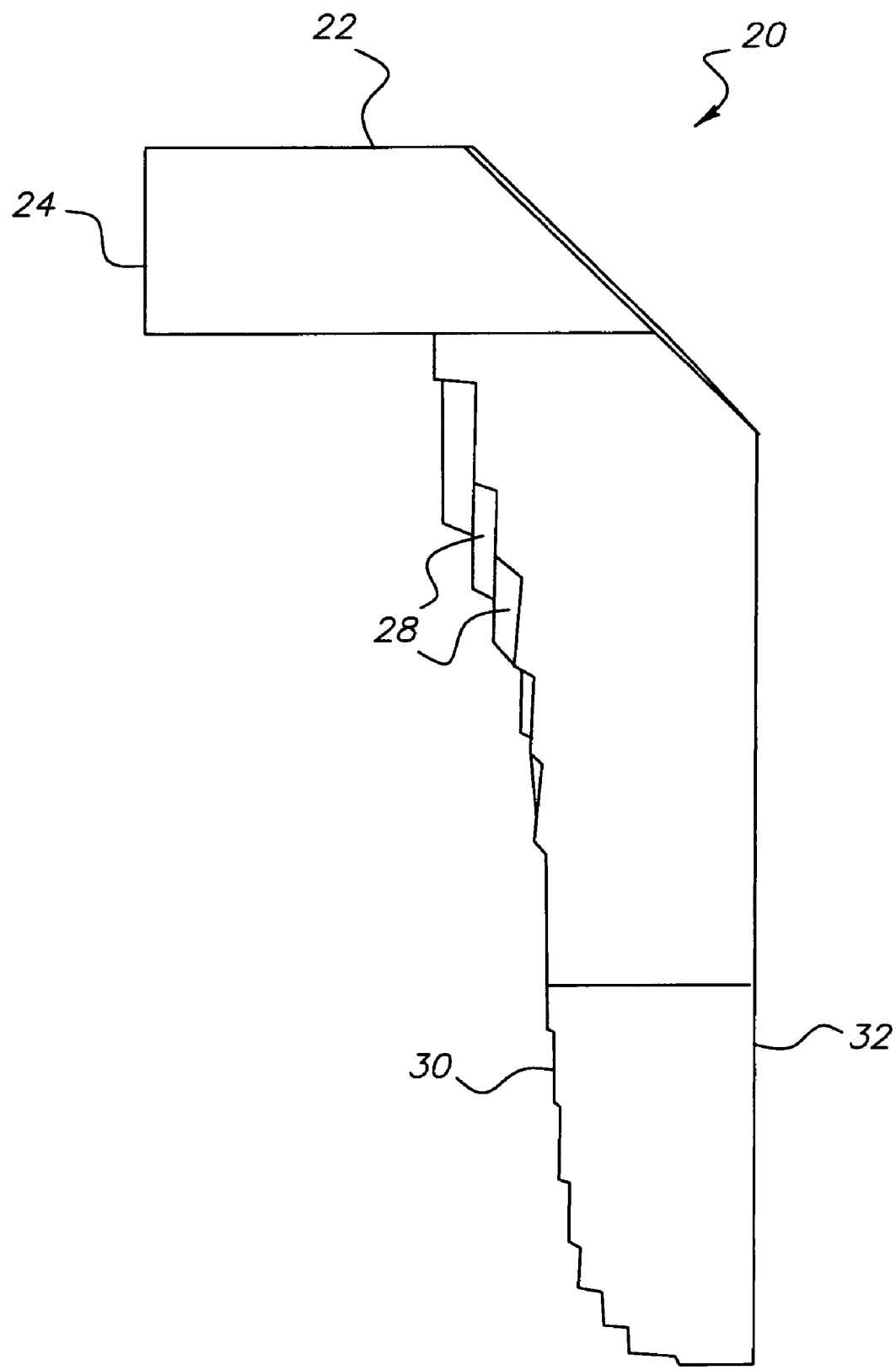
FIG. 10 is a side view of the tapered ring light guide of FIG. 7.
Figure 11A:
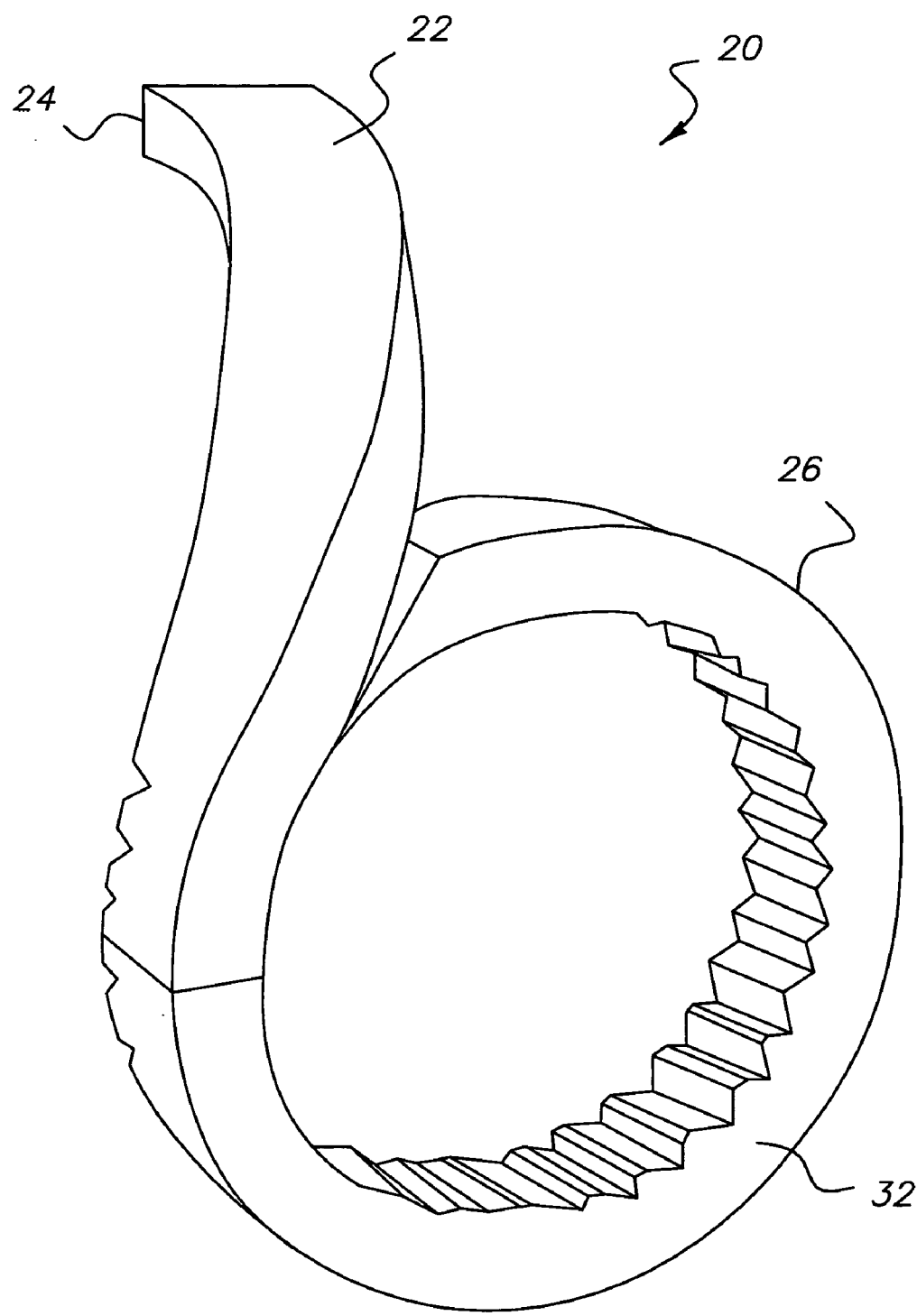
FIGS. 11A, 11B, 11C, and 11D are perspective front, front, perspective rear, and side views, respectively, of a single-piece ring light guide in an alternate embodiment.
Figure 11B:
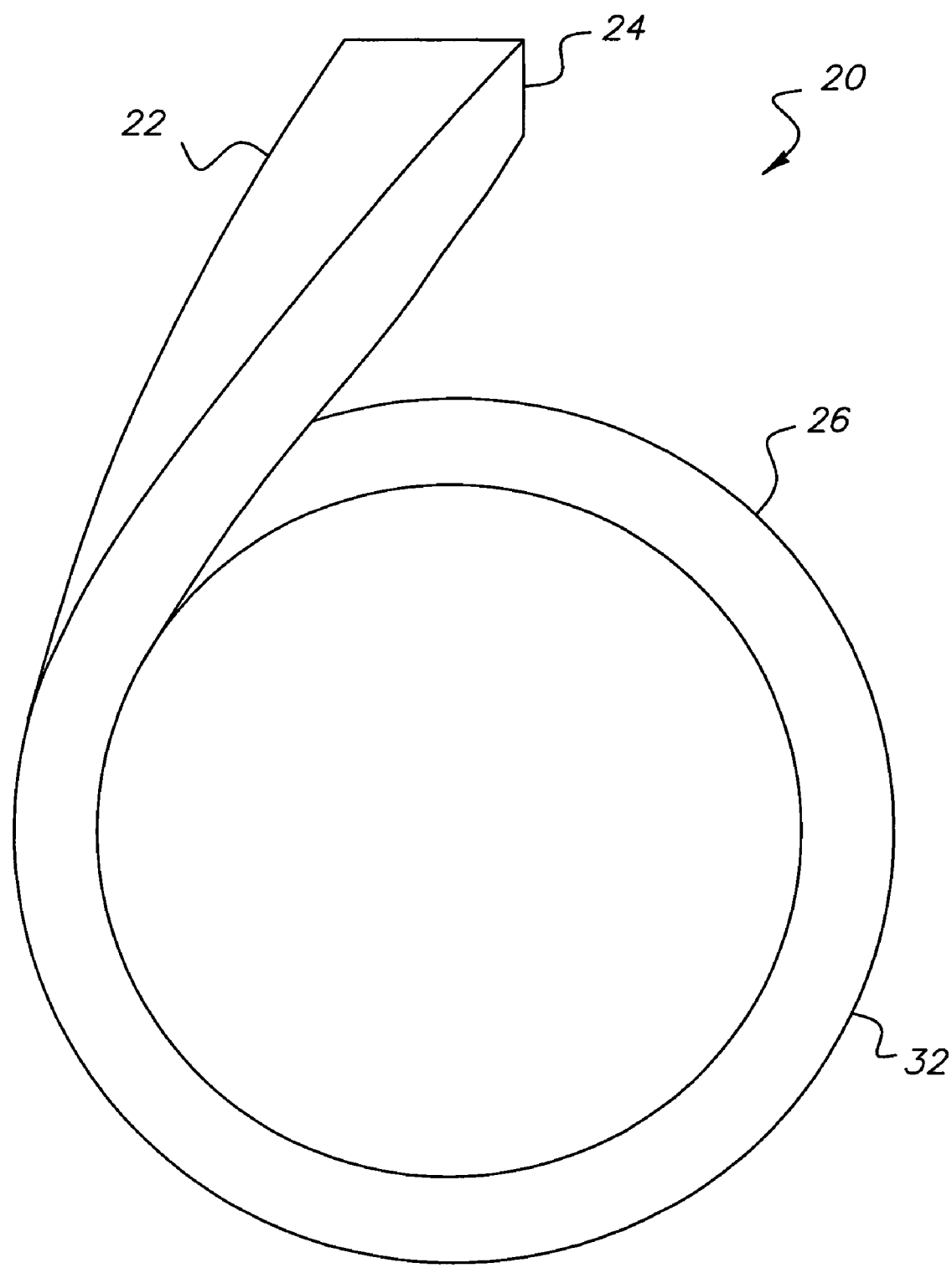
Figure 11C:
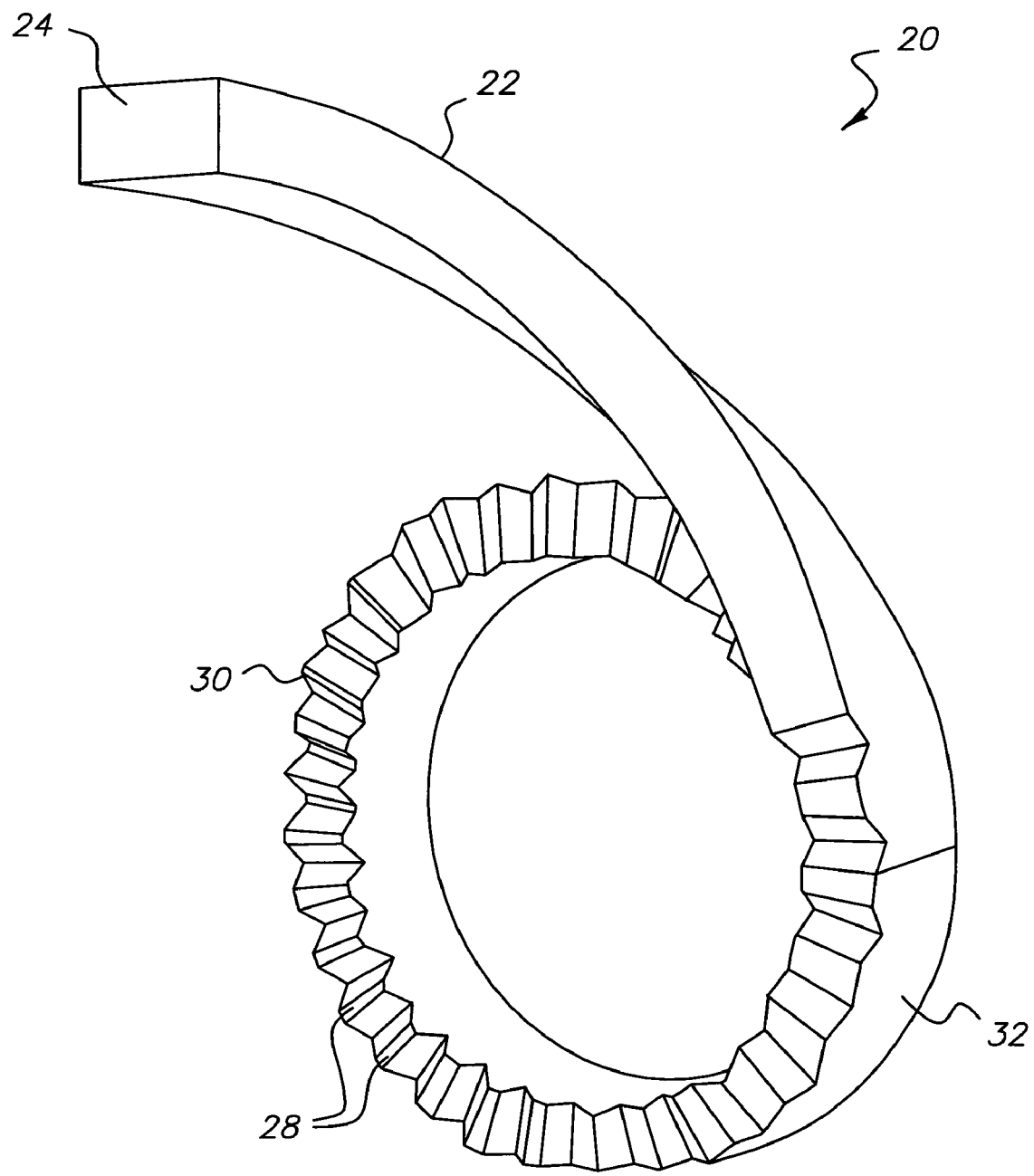
Figure 11D:
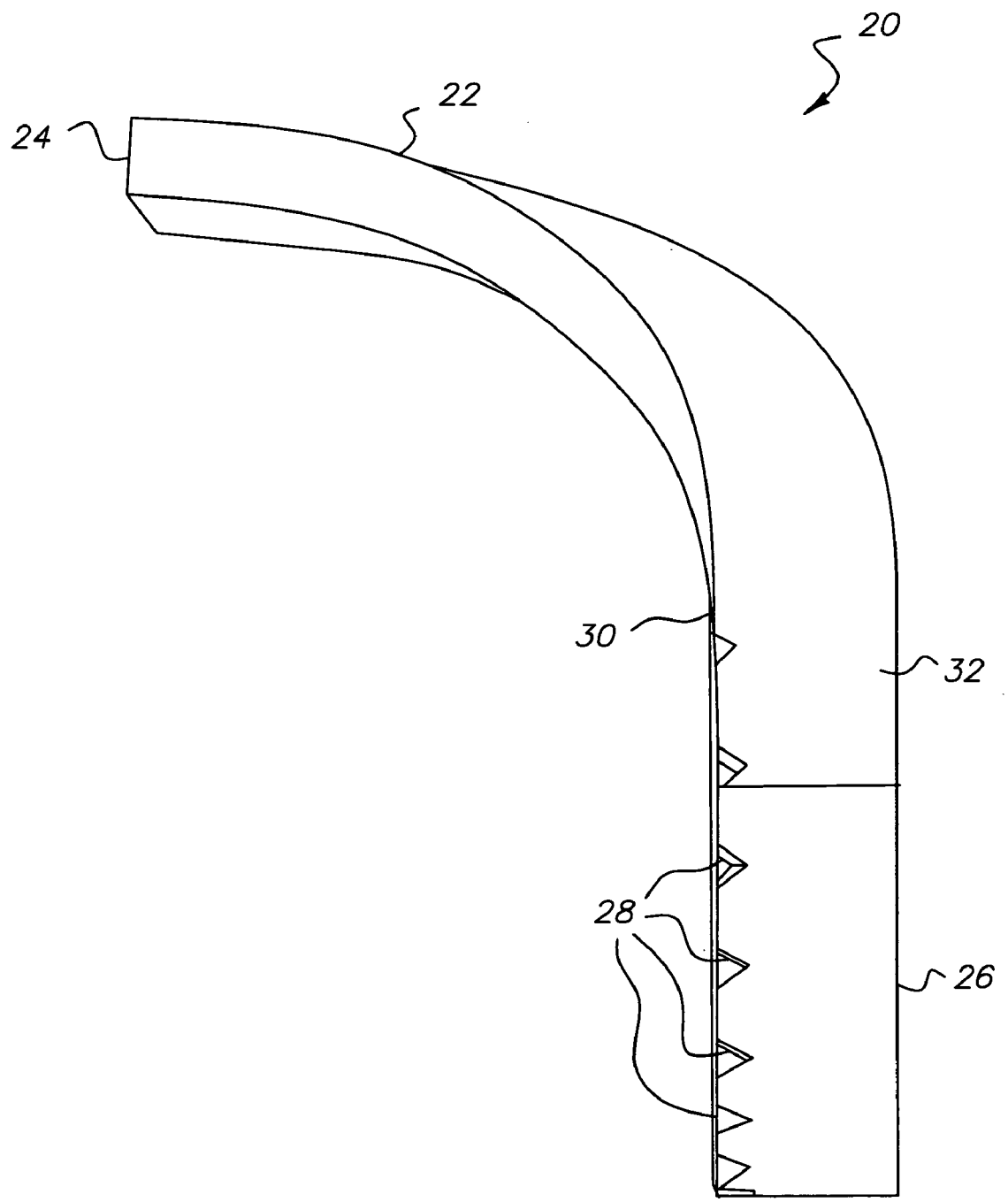

Another variable that can be optimized is the overall thickness of ring section 26. FIGS. 8 and 10 show embodiments in which ring section 26 is tapered, having its thinnest point near the base, in the area that is most distant from light channeling section 22. A tapered arrangement, in combination with an optimized arrangement of features 28, may be most favorable for providing a uniform distribution of light around the lens.

FIGS. 11A–11D show an alternate embodiment of ring light guide 20 that could be described as a single light pipe, curved appropriately for the geometric configuration of the camera. Unlike the embodiments of FIGS. 1–10, this embodiment does not split the light from light channeling section 22 down each side of lens 14. Instead, the embodiment shown in FIGS. 11A–11D directs light around lens 14 in a counterclockwise orientation, as viewed from the perspective of the subject. The operation of ring light guide 20 in this embodiment is similar to that described with reference to FIGS. 1–10. The use of a single curved piece of material, as shown in the embodiment of FIGS. 11A–11D, can provide advantages for positioning ring light guide 20 on lens 14 (FIGS. 1–3), for maintaining this accessory in place, and for leaving at least a portion of sensor 18 unobstructed.

There are a number of composition and fabrication options for the manufacture of ring light guide 20. Typical translucent materials that could be used include glass or various plastics having suitable refractive indices, typically at least about 1.4. Acrylic and other plastic materials are particularly advantageous for fabrication, optical qualities, overall flexibility, cost, adaptability, and durability. The generally rectangular cross-sectional shape of ring light guide 20, as is shown in the various embodiments of this disclosure, is advantaged for providing TIR in this ring light application; however, other cross-sectional shapes could be used.

As noted in the above description, light channeling section 22 and ring section 26 are shaped differently and have different functions, however, these two portions of ring light guide 20 could be continuous, such that ring light guide 20 is fabricated as a single piece. The embodiment of FIGS. 11A–11D, for example, would be well suited for single-piece fabrication. Alternately, both portions of ring light guide 20 could be separately fabricated. In general, the use of the same material for both sections with single-piece construction would be optimal, providing the most robust solution.

A key design consideration for shaping ring light guide 20 is to allow normal operation of camera 12, so that lens 14 could be easily adjusted when ring light guide 20 is in place, for example. Another shape consideration, as noted above, is to maintain any needed clearance to prevent obstruction of sensor 18, to take advantage of the built-in light sensing functions of camera 12.

The invention has been described in detail with particular reference to certain preferred embodiments thereof, but it will be understood that variations and modifications can be effected within the scope of the invention. For example, features 28 of various types may be used to frustrate TIR and cause light redirection. The spacing from one discrete feature 28 to the next may be varied depending on distance from the light source, or the types of features 28 used could be varied, for example. Ring light guide 20 could be provided as a detachable unit or could be implemented as an accessory that is ordinarily mounted on the camera or zoom lens and is rotated into place when needed.

Unlike prior art solutions, ring light guide 20 of the present invention can be designed as a single piece unit. Because it uses TIR to route light from the flash source to its ring illumination output, ring light guide 20 does not need a complex arrangement of surfaces, nor does it need planar reflective coatings on any of its surfaces. Ring light guide 20 can be clipped onto lens 14 as desired, with or without fasteners and without the need for any type of electrical connection to flash synchronization circuitry. A protective casing is not needed during operation, although a soft cloth carrying bag may be desirable to eliminate scratches, particularly along front surface 32. Because ring light guide 20 uses light from built-in camera flash unit 16, the spectral characteristics of the flash illumination are already matched to the camera. In addition, no electrical power connection is needed and no replacement bulb is required. Light sensor 18 of camera 12 and associated flash lighting control circuitry of camera 12 can operate normally, since the simple design of ring light guide 20 allows sensor 18 to be substantially unobstructed with ring light guide 20 installed.

Thus, what is provided is a ring light guide attachable to a camera for redistributing illumination from the camera flash unit.

PARTS LIST 10 image capture system
12 camera
14 lens
16 flash unit
18 sensor
20 ring light guide
22 light channeling section
24 input face
26 ring section
28 features
30 rear surface
32 front surface

The invention claimed is:

1. A ring illuminator comprising:
   a) a light channeling section comprising an input face for optically coupling the light channeling section to a flash unit of a camera for obtaining flash illumination therefrom;
   b) a ring section optically coupled to the light channeling section and extending around an aperture for fitting the ring illuminator around a lens of the camera;
   wherein the ring section comprising a rear surface comprising a plurality of light redirecting features for redirecting at least a portion of the flash illumination from within the ring section outward from the camera, around the lens of the camera; and
   wherein the input face of the light channeling section is parallel to an output face of the flash unit.

2. A ring illuminator according to claim 1 wherein the light redirecting features are selected from a set consisting of grooves, prism structures, and scattering spots.

3. A ring illuminator according to claim 1 wherein the ring illuminator is fabricated as a single piece.

4. A ring illuminator according to claim 1 wherein the light channeling section is separable from the ring section.

5. A ring illuminator according to claim 1 wherein the ring illuminator is a molded plastic unit.

6. An image capture system for obtaining an image of a subject, comprising:
   a) a camera comprising a flash unit;
   b) a lens attached to the camera;
   c) a ring illuminator fitted around the lens, the ring illuminator comprising a light channeling section optically coupled to the flash unit and a ring section optically coupled to the light channeling section and curved about the lens;
   wherein a rear surface of the ring section comprises a plurality of light-redirecting features for redirecting a portion of the illumination obtained from the flash unit outward, toward the subject; and
   wherein an input face of the light channeling section is substantially parallel to an output face of the flash unit.

7. An image capture system according to claim 6 wherein the ring illuminator is a single piece.

8. An image capture system according to claim 6 wherein the flash unit is a pop-up flash unit.

9. An image capture system according to claim 6 wherein the flash unit is a built-in flash unit.

10. An image capture system according to claim 6 wherein the light redirecting features are selected from a set consisting of grooves, prism structures, indentations, and scattering spots.

11. An image capture system according to claim 6 wherein the ring illuminator is comprised of plastic.

12. An image capture system according to claim 6 wherein a bend radius of said light channeling section substantially preserves total internal reflection.

13. An image capture system according to claim 11 wherein said light channeling section transmits greater than 50 percent of light generated by said flash unit.

14. An image capture system according to claim 6 wherein said light channeling section and said light ring section are comprised of multiple components.

15. An image capture system according to claim 6 wherein the lens is integral to said camera.

16. An image capture system as in claim 6 wherein said light channeling section is comprised of glass.

17. A method for providing ring illumination, comprising:
    a) disposing an input face of a light pipe proximate a flash unit of a camera, obtaining flash illumination thereby;
    b) routing a portion of the light pipe at least partially around a camera objective lens to redirect at least a portion of the flash illumination around the lens;
    c) redirecting a portion of the flash illumination from within said light pipe outward along at least one surface of said portion of said curved light pipe; and
    wherein the input face is substantially parallel to an output face of the flash unit.

18. A method as in claim 17 wherein said redirected flash illumination is parallel an axis of said lens.

* * * * *